3,732,302
PROCESS FOR PRODUCING METHACRYLAMIDE
Kazumi Takagi and Teruo Matsuda, Niihama, Japan, assignors to Sumitomo Chemical Co., Ltd., Osaka-shi, Osaka-fu, Japan
Filed Apr. 30, 1970, Ser. No. 33,332
Int. Cl. C07c 103/00
U.S. Cl. 260—561 N                7 Claims

ABSTRACT OF THE DISCLOSURE

A process for producing methacrylamide of high purity which comprises neutralizing an aqueous solution of methacrylamide sulfate, obtained by the reaction between acetone cyanohydrin and sulfuric acid in a conventional manner, with ammonia to a neutralization degree of below 95%, collecting the crude methacrylamide precipitated upon cooling, and purifying the collected crude methacrylamide with water or with an aqueous solution of ammonia.

---

Figure 1:
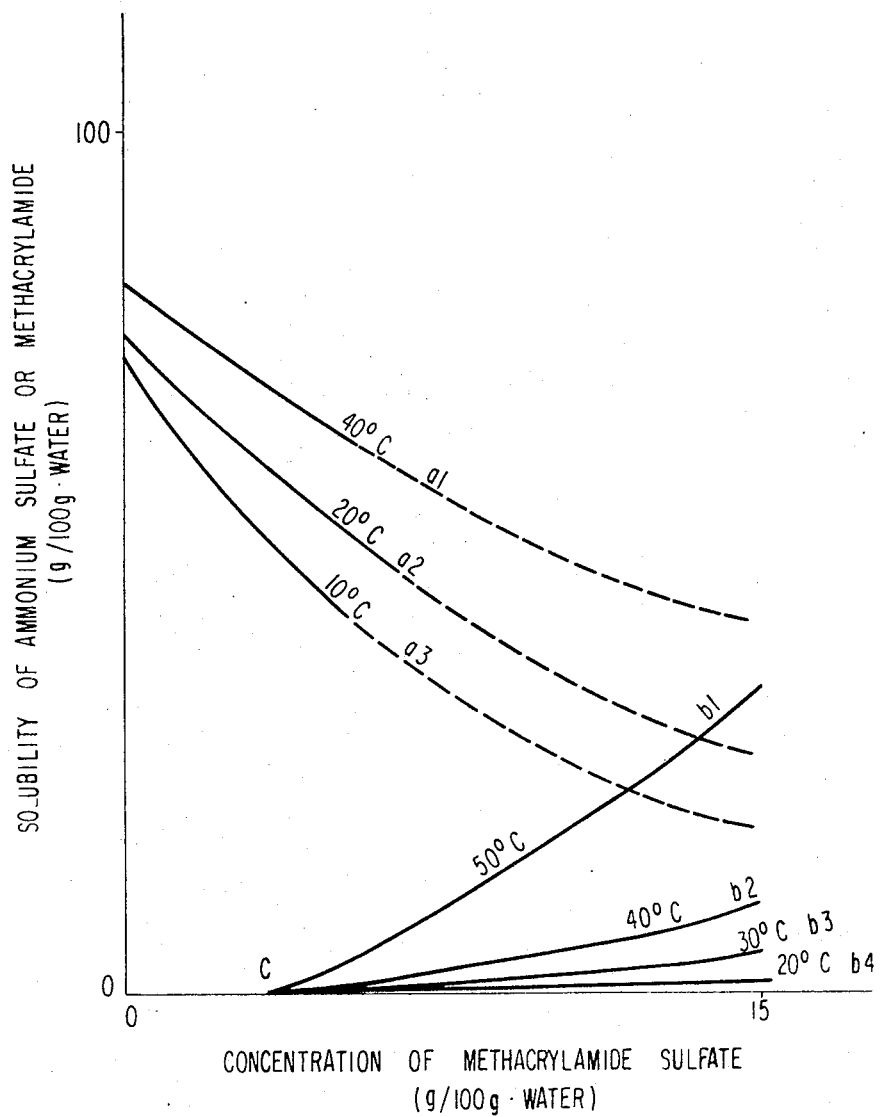

The present invention relates to a process for producing methacrylamide. More particularly, it relates to a process for the production of methacrylamide of high purity by neutralizing an aqueous solution of methacrylamide sulfate with ammonia.

Methacrylamide has been prepared in the prior art by various methods. Among these methods, the production of methacrylamide by neutralizing the methacrylamide sulfate obtained from acetone cyanohydrin and sulfuric acid is the most economical and simple. This method, however, requires an excessive amount of sulfuric acid for the amount of acetone cyanohydrin employed and a high reaction temperature above 140° C. Because of these rigorous conditions, the produced methacrylamide sulfate is markedly colored, for instance, to a deep brown or dark brown. The neutralization of methacrylamide sulfate with aqueous ammonia solution provides methacrylamide which is considerably contaminated with ammonium sulfate and is highly colored. This coloration is only slightly eliminated even after washing with an ordinary solvent such as benzene and recrystallizing repeatedly. Although the coloration is reduced to a certain extent by treatment with methyl ethyl ketone or methyl isobutyl ketone, the use of these solvents is not favorable industrially because of the large losses thereof which are encountered and because of their high cost. The purification of crude methacrylamide by sublimation or distillation is relatively effective but the operation is troublesome. In view of these facts, it is difficult to obtain highly pure methacrylamide from crude methacrylamide sulfate obtained by the reaction between acetone cyanohydrin and sulfuric acid according to the conventional purification procedures.

Accordingly, one of the objects of the present invention is to provide a process for producing methacrylamide of high purity which overcomes the disadvantages and deficiencies of the prior art.

Another object of the invention is to provide a process for producing methacrylamide which may be carried out advantageously and economically on an industrial scale.

A further object of the present invention is to provide methacrylamide of high purity.

These and other objects and advantages of the present invention will become apparent to those skilled in the art from a consideration of the following specification and claims.

In accordance with the present invention and as the result of various studies, it has been found that a specific relationship of solubility, as shown in FIG. 1 of the accompanying drawing, is present among the four components, i.e., methacrylamide sulfate, water, methacrylamide and ammonium sulfate. It has also been found that, when methacrylamide sulfate is neutralized incompletely with ammonia and the methacrylamide is precipitated as a result of the said specific solubility relationship, the product is obtained in a high purity and with a good efficiency. The present invention has been developed on the basis of these findings.

According to the present invention, a process for producing methacrylamide is provided which comprises neutralizing methacrylamide sulfate with ammonia in water to a neutralization degree of below 95% (preferably 80 to 90%), collecting the precipitated crude methacrylamide from the neutralized mixture, and purifying the collected crude methacrylamide with water which does or does not contain ammonia.

The methacrylamide sulfate used as the raw material in the process of this invention may be prepared by reacting acetone cyanohydrin with sulfuric acid in a molar ratio of 1:1.3 to 1:2.0 at a reaction temperature of from 60° to 160° C. This compound is in an aqueous solution state when it is neutralized.

As noted above, FIG. 1 shows the solubility inclination of the four-component system (i.e., methacrylamide sulfate-water-methacrylamide-ammonium sulfate), the lines $a_1$ to $a_3$ each showing the solubility of ammonium sulfate in an aqueous solution containing methacrylamide sulfate and methacrylamide at various temperatures and the lines $b_1$ to $b_4$ each showing the solubility of methacrylamide at various temperatures in an aqueous solution of methacrylamide sulfate saturated with ammonia sulfate at 20° C. The axis of the abscissa represents the concentration of methacrylamide sulfate, and the degree of neutralization of the methacrylamide sulfate proceeds as the origin is approached along this axis.

As can be seen from FIG. 1, the solubility of the produced ammonium sulfate increases and that of the produced methacrylamide decreases as the neutralization degree advances in the case of a constant temperature. When the point designated as C is reached (neutralization degree: about 90%) the solubility of the methacrylamide becomes almost zero, and substantially all of the methacrylamide is precipitated, whereby the mother liquor becomes an aqueous solution only containing ammonium sulfate in addition to a small amount of methacrylamide sulfate. This phenomenon is also observed at a lower temperature, such as below 30° C., in case that the degree of neutralization is lower, namely when the concentration of methacrylamide sulfate is higher.

As a result of investigations on the neutralization of methacrylamide sulfate with ammonia, it has been found that, although crude crystals of methacrylamide separated after neutralization are almost white in the case of a neutralization degree of below 95%, particularly below 90%, crude crystals of methacrylamide separated after neutralization take a remarkable coloration, namely a deep yellowish-brown, in the case of a neutralization degree of above the said limit. Thus, crude crystals of methacrylamide free of coloration can be separated by adjusting the neutralization degree below the said limit. When the neutralization is effected toward this degree of neutralization, almost the whole amount of the produced methacrylamide is precipitated because of the above-described solubility characteristics.

When the neutralization degree is lowered too much, it is necessary to circulate a considerable amount of the mother liquor after separation of the crystals into the neutralizing system. Yet, it remains difficult to control the neutralization to a degree of below 90% with the usual industrial apparatus. If the neutralization is controlled with an ordinary pH meter, it is necessary that the pH indicator point in the range of its minimum index (i.e., a pH value of zero or below zero). In the neutralization step described in the present invention, the degree of neutralization at the zero value of the pH indicator is equivalent to a neutralization degree of 80%. A neutralization degree of 95% corresponds to pH 1. Thus, the neutralization can be controlled well within the range of pH values from 0 to 1. For this reason, it is desirable to effect the neutralization in the range of pH 0 to pH 1.

The amount of water in the reaction mixture neutralized to a neutralization degree of 80 to 95% should be controlled so as to make sure the produced ammonium sulfate is not in a condition of oversaturation. It is particularly favorable to adjust the amount of water so as to make a saturated or slightly less concentration of ammonium sulfate, because the solubility of methacrylamide therein is remarkably low. The supply of water for this purpose may be suitably effected either before or during neutralization. When water is supplied before neutralization, ammonia gas or liquid ammonia may be used as the neutralizing agent. When water is supplied during neutralization, an aqueous ammonia solution may be employed as the neutralizing agent. In case that the amount of the ammonium sulfate produced in the reaction mixture after neutralization rises above the saturating solubility curve of ammonium sulfate as shown in FIG. 1, a large amount of ammonium sulfate is retained in the crude methacrylamide separated after neutralization, thus markedly decreasing the efficiency of the purification of methacrylamide.

A suitable temperature for the neutralization step in the present invention is from about 5° to about 30° C., particularly from 20° to 25° C.

The methacrylamide produced from the reaction mixture neutralized to a neutralization degree of 80 to 90% is precipitated with cooling. A suitable temperature for cooling is from 5° to 25° C., although a temperature range of from 0° to 25° C. is feasible.

The precipitated methacrylamide is then collected by a conventional procedure, for example, by filtration.

Since the collected methacrylamide is contaminated with a small amount of methacrylamide sulfate and a trace amount of ammonium sulfate, it is subjected to purification. The purification may be carried out by recrystallizing from water or from an aqueous ammonia solution. Although the purpose of purification can be attained well by the use of water, recrystallization from an aqueous ammonia solution containing ammonia in an amount sufficient to convert the methacrylamide sulfate remaining in crude crystals of methacrylamide into methacrylamide is preferred in the case where a trace amount of methacrylamide sulfate is retained together with the purified methacrylamide. In lieu of employing said recrystallization step, the crude crystals of methacrylamide may be washed with water or with an aqueous ammonia solution. In general, the concentration of ammonia in the aqueous solution used for the purification is not more than 10%.

The mother liquor contains a large amount of methacrylamide and small amounts of methacrylamide sulfate and ammonium sulfate after separation of the methacrylamide in the purification step. Therefore, it may be recycled to be used as a part of the water to be employed in the neutralization step, resulting in a substantial increase in the yield of methacrylamide.

In order to prevent the polymerization of methacrylamide in the above operations, such as neutralization and purification, a polymerization inhibitor such as thiourea or t-butylamine may be used, if necessary.

The mother liquor, after separation of the crude methacrylamide from the neutralized mixture, constitutes an aqueous solution of ammonium sulfate containing a small amount of methacrylamide sulfate. Thus the recovery of methacrylamide therefrom can be effected by the addition of ammonia in an amount equivalent to the methacrylamide sulfate contained therein.

The following examples are given merely as illustrative of the present invention and are not to be considered as limiting. They represent practical and presently-preferred embodiments of the present invention. The Harzen Number (APHA) shown therein represents the value colorimetrically determined by the method described in ASTM D–1209–62 using as the standard the color of an aqueous solution of $K_2PtCl_6$—$CoCl_2 \cdot 6H_2O$.

EXAMPLE 1

Into a 500 ml. volume beaker equipped with a dropping funnel, a stirrer and a pH meter, there are charged crude methacrylamide sulfate (100 g.), prepared from acetone cyanohydrin and sulfuric acid in a molar ratio of 1:1.6 at 150° C., and water (100 ml). A 30% aqueous ammonia solution (76 ml.) is added dropwise to this mixture with stirring over a period of 30 minutes. The resultant mixture shows a pH of 0.5 and has a neutralization degree of 90%. The temperature within the beaker is kept at 20° to 25° C. during neutralization. After neutralization, the reaction mixture is cooled to 5° C. and is preserved at this temperature for 60 minutes. The precipitate is collected on a glass filter by filtration with aspiration to obtain crude methacrylamide (29.8 g.), which is white in color. Recrystallization from an aqueous solvent gives methacrylamide of 99.1% purity.

Into the same beaker as described above, there are charged crude methacrylamide sulfate (100 g.) and water (100 ml.). A 30% aqueous ammonia solution (85 ml.) is added dropwise to the mixture with stirring over a period of 30 minutes. The resultant mixture shows a pH of 3.5 and has a degree of neutralization of 100%. The temperature within the beaker is kept at 20° to 25° C. during the neutralization. After neutralization, the reaction mixture is cooled to 5° C. and is preserved at the same temperature for 60 minutes. The precipitate is collected on a glass filter by filtration with aspiration to obtain crude methacrylamide (29.6 g.), which has a deep yellowish-brown color.

EXAMPLE 2

Into the same beaker as described in Example 1, there are charged crude methacrylamide sulfate (100 g.) and water (100 ml.). Added dropwise to the mixture is a 30% aqueous ammonia solution (67 ml.) with stirring over a period of 30 minutes. The resultant mixture shows a pH of zero and has a neutralization degree of 80%. During the neutralization, the temperature within the beaker is kept at 20° to 25° C. After neutralization, the reaction mixture is cooled to 5° C. and is preserved at the same temperature for 60 minutes. The precipitate is collected on a glass filter by filtration with aspiration to obtain crude methacrylamide (31.4 g.), which is white. Added to the crude methacrylamide are water (36 ml.) and thiourea (0.002 g.) as a polymerization inhibitor, and the resultant mixture is warmed at 40° C. to form a solution. The solution is cooled to 5° C. and is allowed to stand for 60 minutes. The precipitate is collected by filtration with aspiration and is dried to give white methacrylamide (18.3 g.). The methacrylamide shows a purity of 99.5% and a Harzen Number (APHA) in a 10% aqueous solution of 20.

The use of dilute aqueous ammonia solution (37 ml.) in lieu of water for recrystallizing the crude methacrylamide gives methacrylamide of nearly the same purity as described above.

EXAMPLE 3

Crude methacrylamide sulfate (100 g.) and water (100 ml.) are charged into the same beaker as described in Example 1. To the mixture, there is added dropwise a 30% aqueous ammonia solution (67 ml.) with stirring over a 30 minute period. The resultant mixture shows a pH of 0.1 and has a degree of neutralization of about 90%. The temperature within the beaker is kept at 20° to 25° C. After neutralization, the concentration of ammonium sulfate is 50 g. per 100 g. of water. After neutralization, the reaction mixture is cooled to 5° C. and is allowed to stand at the same temperature for 60 minutes. The precipitate is collected on a glass filter by filtration with aspiration to obtain crude methacrylamide (32.0 g.). Water (43 ml.) and thiourea (0.002 g.) are added to the crude methacrylamide, and the resultant mixture is warmed at 40° C. to form a solution. The solution is cooled to 5° C. and is preserved at the same temperature for 60 minutes. The precipitate is collected by filtration with aspiration and is dried to give white crystals (19 g.).

The mother liquor obtained after filtration is circulated as a part of the water required for the initial neutralization. The crystals obtained after repeating the described procedure five times from the circulation of the mother liquor to the recrystallization are dried to give white methacrylamide (24.6 g.). The resultant methacrylamide has a purity of 99.4% and a Harzen Number (APHA) in 10% aqueous solution of 25. The yield of methacrylamide is 96%.

The invention being thus described, it will be obvious that same may be varied in many ways. Such variations are not to be regarded as a departure from the spirit and scope of the invention, and all such modifications as would be obvious to one skilled in the art are intended to be included herein.

We claim:
1. A process for producing methacrylamide of high purity which comprises neutralizing methacrylamide sulfate with ammonia in water to a neutralization degree of below 95%, collecting the precipitated crude methacrylamide from the neutralized mixture, and purifying the collected crude methacrylamide with water or with an aqueous solution of ammonia.

2. The process according to claim 1, wherein the degree of neutralization is 80 to 90%.

3. The process according to claim 1, wherein the neutralization step is carried out at a temperature of about 5° to 30° C.

4. The process according to claim 1, wherein the neutralization step is carried out at a pH of 0 to 1.

5. The process according to claim 1, wherein the amount of water present during the neutralization step is controlled so that a saturated or slightly less concentration of ammonium sulfate is obtained.

6. The process according to claim 1, wherein the purifying step is conducted by recrystallizing the methacrylamide from water or from an aqueous ammonia solution.

7. The process according to claim 1, wherein the resultant mother liquor is recycled to the neutralization step.

References Cited

UNITED STATES PATENTS

| 3,549,706 | 12/1970 | Takaki et al. | 260—561 N |
| 3,502,719 | 3/1970 | Schroder et al. | 260—561 N |

FOREIGN PATENTS

| 606,096 | 8/1948 | Great Britain | 260—561 N |

LEWIS GOTTS, Primary Examiner

E. G. LOVE, Assistant Examiner